(12) United States Patent
Cain

(10) Patent No.: US 8,161,193 B1
(45) Date of Patent: Apr. 17, 2012

(54) SYSTEM, DEVICE, AND METHOD FOR SENDING KEEP-ALIVE MESSAGES IN A COMMUNICATION NETWORK

(75) Inventor: Bradley Cain, Cambridge, MA (US)

(73) Assignee: Rockstar Bidco LP, New York, NY (US)

( * ) Notice: Subject to any disclaimer, the term of this patent is extended or adjusted under 35 U.S.C. 154(b) by 0 days.

(21) Appl. No.: 09/457,209

(22) Filed: Dec. 8, 1999

(51) Int. Cl.
G06F 15/173 (2006.01)
(52) U.S. Cl. ........ 709/242; 709/238; 709/224; 709/223; 709/226; 370/351; 370/241; 370/245
(58) Field of Classification Search .................. 703/223, 703/226
See application file for complete search history.

(56) References Cited

U.S. PATENT DOCUMENTS

| | | | | | |
|---|---|---|---|---|---|
| 5,542,047 | A | * | 7/1996 | Armstrong | 709/224 |
| 5,627,766 | A | * | 5/1997 | Beaven | 702/122 |
| 5,659,787 | A | * | 8/1997 | Schieltz | 709/226 |
| 5,694,547 | A | * | 12/1997 | Subramanian et al. | 709/224 |
| 5,710,885 | A | * | 1/1998 | Bondi | 709/224 |
| 5,715,260 | A | | 2/1998 | Black et al. | 371/47.1 |
| 5,799,154 | A | * | 8/1998 | Kuriyan | 709/223 |
| 5,805,818 | A | * | 9/1998 | Perlman et al. | 709/224 |
| 5,862,404 | A | * | 1/1999 | Onaga | 710/8 |
| 5,870,556 | A | * | 2/1999 | Cote et al. | 709/224 |
| 5,968,116 | A | * | 10/1999 | Day et al. | 709/202 |
| 5,974,237 | A | * | 10/1999 | Shurmer et al. | 709/224 |
| 6,006,017 | A | * | 12/1999 | Joshi et al. | 709/224 |
| 6,182,132 | B1 | * | 1/2001 | Bilakanti et al. | 709/223 |
| 6,249,814 | B1 | * | 6/2001 | Shaffer et al. | 709/223 |
| 6,275,874 | B1 | * | 8/2001 | Wilson | 710/8 |
| 6,405,250 | B1 | * | 6/2002 | Lin et al. | 709/224 |
| 6,424,626 | B1 | * | 7/2002 | Kidambi et al. | 370/236 |
| 6,597,700 | B2 | * | 7/2003 | Golikeri et al. | 370/401 |
| 7,035,214 | B1 | * | 4/2006 | Seddigh et al. | 370/231 |
| 7,342,897 | B1 | * | 3/2008 | Nader et al. | 370/255 |
| 7,647,616 | B2 | * | 1/2010 | Puthiyedath | 725/107 |
| 7,672,241 | B2 | * | 3/2010 | Foore et al. | 370/235 |
| 2005/0138112 | A1 | * | 6/2005 | Sagar et al. | 709/203 |
| 2008/0001711 | A1 | * | 1/2008 | Agarwal et al. | 340/10.1 |
| 2008/0077435 | A1 | * | 3/2008 | Muradia | 705/2 |

OTHER PUBLICATIONS

Wollman et al., Overview of Open Shortest Path First, Version 2 (OSPF V2) Routing in the Tactical Environment, IEEE Communications Magazine, 1995, pp. 925-930.
Mosedale et al., Administering Very High Volume Internet Services, LISA IX, Sep. 17-22, 1995, pp. 95-102.
Anderson et al., ATM-Layer OAM Implementation Issues, IEEE Communications Magazine, Sep. 29, 1991, pp. 79-81, No. 9.

* cited by examiner

Primary Examiner — Syed A. Zia
(74) Attorney, Agent, or Firm — Anderson, Gorecki & Manaras LLP

(57) ABSTRACT

A system, device, and method for sending keep-alive messages in a communication network involves determining a reliability factor for communicating with a neighbor and setting the frequency for sending keep-alive messages to the neighbor based upon the reliability factor. The reliability factor is determined based upon the reliability of the neighbor as well as the reliability of the communication link to the neighbor. The frequency for sending keep-alive messages to the neighbor is relatively high if the reliability factor is low. The frequency for sending keep-alive messages to the neighbor is relatively low if the reliability factor is high. The frequency for sending keep-alive messages to the neighbor is dynamically adjusted based upon an updated reliability factor.

22 Claims, 4 Drawing Sheets

FIG. 1    100

SYSTEM, DEVICE, AND METHOD FOR SENDING KEEP-ALIVE MESSAGES IN A COMMUNICATION NETWORK

FIELD OF THE INVENTION

The present invention relates generally to communication systems, and more particularly to sending keep-alive messages in a communication system.

BACKGROUND OF THE INVENTION

In today's information age, computers and computer peripherals are often internet worked over a communication network. The communication network includes a number of network nodes that interoperate to route protocol messages within the communication network. These network nodes typically run various routing protocols in order to determine forwarding paths for routing protocol messages within the communication network.

When a network node fails, the other network nodes need to route the protocol messages around the failed network node. The network nodes typically rely on "keep-alive" messages to determine whether a particular network node is operational. Each node periodically sends keep-alive messages to its neighbors. A network node may consider a particular neighbor to be operational as long as the neighbor is sending keep-alive messages.

Therefore, each network node receives keep-alive messages from its neighbors. The processing of keep-alive messages can be computationally intensive, especially if the network node has many neighbors.

SUMMARY OF THE INVENTION

In accordance with one aspect of the invention, the frequency for sending keep-alive messages to a neighbor is determined based upon a reliability factor for communicating with the neighbor. A node determines a reliability factor for communicating with a neighbor and sets the frequency for sending keep-alive messages to the neighbor based upon the reliability factor. The reliability factor is determined based upon the reliability of the neighbor as well as the reliability of the communication link to the neighbor. The frequency for sending keep-alive messages to the neighbor is relatively high if the reliability factor is low. The frequency for sending keep-alive messages to the neighbor is relatively low if the reliability factor is high. The frequency for sending keep-alive messages to the neighbor is dynamically adjusted based upon an updated reliability factor.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
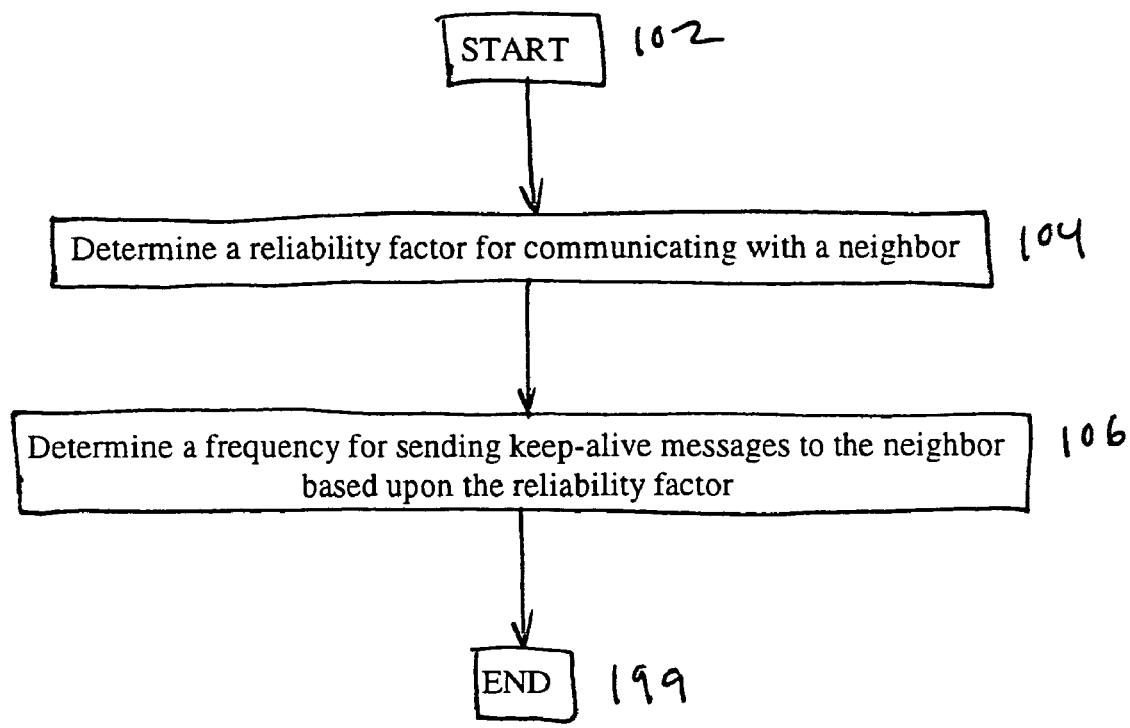
FIG. 1 is a logic flow diagram showing exemplary logic for determining a frequency for sending keep-alive messages to a neighbor in accordance with an embodiment of the invention.

An exemplary embodiment of the present invention sets the frequency for sending keep-alive messages to a particular neighbor based upon a reliability factor for communicating with the neighbor. The keep-alive messages are sent at a relatively low frequency if the reliability factor for communicating with the neighbor is high. This is because there is a relatively high likelihood that each keep-alive message will be received and processed by the neighbor, so fewer keep-alive messages are needed to keep the communication link to the neighbor active. The keep-alive messages are sent at a relatively high frequency if the reliability factor for communicating with the neighbor is low. This is because there is a relatively low likelihood that each keep-alive message will be received and processed by the neighbor, so more keep-alive messages are needed to keep the communication link to the neighbor active. The reliability factor is updated regularly, and the frequency for sending keep-alive message to the neighbor is dynamically adjusted accordingly.

Specifically, each node determines a reliability factor for communicating with each of its neighbors, and sets the frequency of keep-alive messages for each neighbor based upon the corresponding reliability factor. The reliability factor is preferably based upon the reliability of the neighbor as well as the reliability of the communication link to the neighbor, both of which can be determined to some degree and can vary over time. The node continually updates the reliability factor and adjusts the frequency of keep-alive messages accordingly.

More particularly, the node determines a reliability for the neighbor and a reliability for the communication link to the neighbor using predetermined reliability determination techniques. For example, the node may determine the reliability of the communication link to the neighbor by measuring communication link characteristics, such as signal-to-noise ratio, harmonic distortion, phase hits, gain hits, carrier-to-noise ratio, bit error rate, block error rate, packet error rate, cell loss ratio, congestion, or other characteristics. The node may determine the reliability for the neighbor based upon keep-alive or other messages received from the neighbor, including explicit status information provided by the neighbor. However, the present invention is in no way limited to any particular technique or techniques for determining the reliability of the neighbor and/or the reliability of the communication link to the neighbor. Once the node determines the reliability for the neighbor and the reliability for the communication link to the neighbor, the node determines the reliability factor based upon the reliability for the neighbor and the reliability for the communication link to the neighbor. In an exemplary embodiment of the invention, the node assigns a relative weight to each reliability determination. The reliability factor is the weighted average of the two reliability determinations. Thus the reliability factor RF can be represented by the following equation:

$$RF = (W1*A + W2*B) \qquad \text{Eq. 1}$$

where A is the reliability for the communication link to the neighbor, B is the reliability for the neighbor, W1 is the relative weight for A, and W2 is the relative weight for B.

The weights W1 and W2 are implementation-specific. In an exemplary weighting scheme, the weights W1 and W2 are initially set equal. The weights may be adjusted thereafter as network conditions change.

After determining the reliability factor RF for communicating with the neighbor, the node determines the frequency for sending keep-alive messages to the neighbor based upon the reliability factor RF. The frequency for sending keep-alive messages to the neighbor is inversely proportional to the reliability factor RF. Thus, the frequency for sending keep-alive messages to the neighbor is relatively low if the reliability factor RF is high, and the frequency for sending keep-alive messages to the neighbor is relatively high if the reliability factor RF is low.

FIG. 1 is a logic flow diagram showing exemplary logic 100 for determining a frequency for sending keep-alive messages to a neighbor. Beginning at step 102, the logic first determines a reliability factor for communicating with a neighbor, in step 104. The logic then determines a frequency for sending keep-alive messages to the neighbor based upon the reliability factor, in step 106. The logic 100 terminates in step 199.

Figure 2:
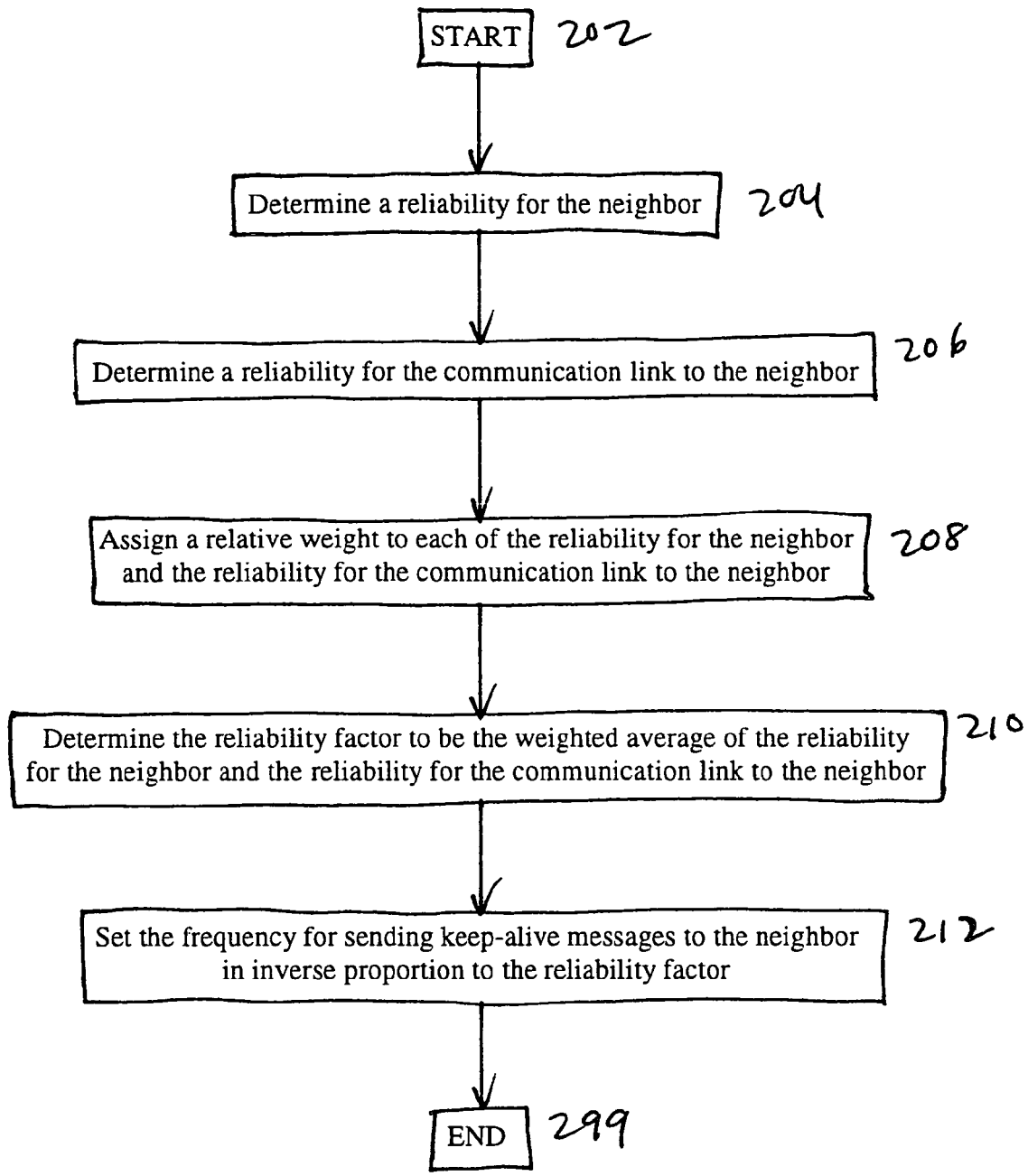
FIG. 2 is a logic flow diagram showing exemplary logic for determining a reliability factor in accordance with an embodiment of the invention.

FIG. 2 is a logic flow diagram showing exemplary logic 200 for determining the reliability factor. Beginning at step 202, the logic determines a reliability for the neighbor, in step 204, and also determines a reliability for the communication link to the neighbor, in step 206. The logic then assigns a relative weight to each of the reliability for the neighbor and the reliability for the communication link to the neighbor, in step 208. The logic then determines the reliability factor to be the weighted average of the reliability for the neighbor and the reliability for the communication link to the neighbor, in step 210. The logic then sets the frequency for sending keep-alive messages to the neighbor in inverse proportion to the reliability factor, in step 212. The logic 200 terminates in step 299.

Figure 3:
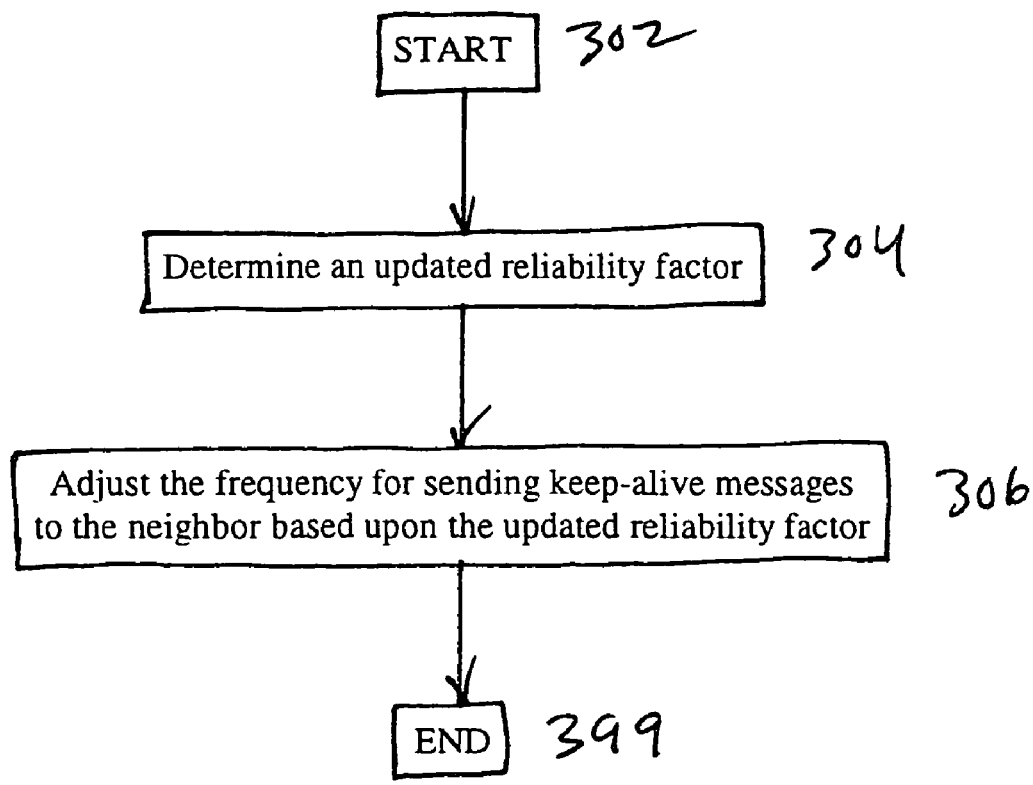
FIG. 3 is a logic flow diagram showing exemplary logic for adjusting the frequency for sending keep-alive messages to a neighbor in accordance with an embodiment of the invention.

FIG. 3 is a logic flow diagram showing exemplary logic 300 for adjusting the frequency for sending keep-alive messages to a neighbor. Beginning at step 302, the logic proceeds to determine an updated reliability factor, in step 304. The logic then adjusts the frequency for sending keep-alive messages to the neighbor based upon the updated reliability factor, in step 306. The logic 300 terminates in step 399.

Figure 4:
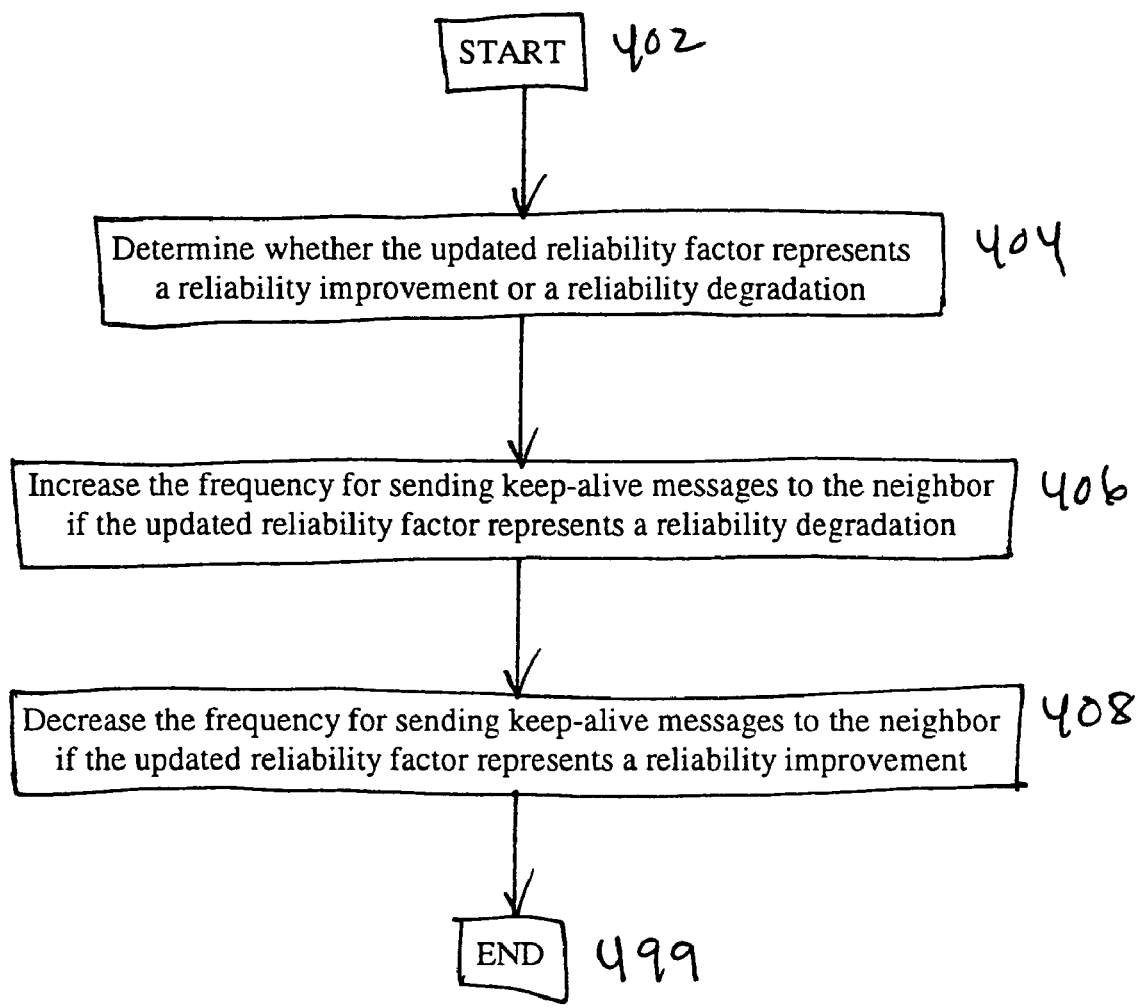
FIG. 4 is a logic flow diagram showing exemplary logic for adjusting frequency for sending keep-alive messages to a neighbor based upon an updated reliability factor in accordance with an embodiment of the invention.

FIG. 4 is a logic flow diagram showing exemplary logic 400 for adjusting frequency for sending keep-alive messages to a neighbor based upon an updated reliability factor. Beginning at step 402, the logic determines whether the updated reliability factor represents a reliability improvement or a reliability degradation, in step 404. The logic increases the frequency for sending keep-alive messages to the neighbor if the updated reliability factor represents a reliability degradation, in step 406. The logic decreases the frequency for sending keep-alive messages to the neighbor if the updated reliability factor represents a reliability improvement, in step 408. The logic 400 terminates in step 499.

In the described embodiments, the reliability factor is proportional to the reliability for communicating with the neighbor, and therefore the frequency for sending keep-alive messages to the neighbor is inversely proportional to the reliability factor. However, in an alternative embodiment of the invention, the reliability factor may be inversely proportional to the reliability for communicating with the neighbor (for example, the reliability factor may be an error measurement that increases as the reliability decreases), in which case the frequency for sending keep-alive messages to the neighbor is proportional to the reliability factor. The present invention is in no way limited by the technique for determining the reliability factor nor by the technique for deriving the frequency for sending keep-alive messages based upon the reliability factor.

In an exemplary embodiment of the present invention, predominantly all of the logic for sending keep-alive messages described herein is implemented as a set of computer program instructions that are stored in a computer readable medium and executed by an embedded microprocessor system within a network node. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), The medium may be a tangible medium (e.g., optical or analog communications lines). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for sending keep-alive messages by a node to a neighbor in a communication network, the method comprising:

measuring a reliability of a communication link to the neighbor; and periodically calculating a reliability factor for communicating with the neighbor based upon the reliability of the communication link to the neighbor;

varying a frequency for sending keep-alive messages to the neighbor based upon the reliability factor; and sending keep-alive messages by the node to the neighbor in accordance with those steps.

2. The method of claim 1, wherein periodically calculating a reliability factor for communicating with the neighbor comprises:

determining a reliability for the neighbor; and wherein the step of calculating the reliability factor is further based upon the reliability for the neighbor.

3. The method of claim 1, wherein varying a frequency for sending keep-alive messages to the neighbor based upon the reliability factor comprises:
   setting the frequency for sending keep-alive messages to the neighbor in inverse proportion to the reliability factor.

4. The method of claim 1, further comprising:
   updating the reliability factor; and
   adjusting the frequency for sending keep-alive messages to the neighbor based upon the reliability factor.

5. The method of claim 2, wherein periodically calculating a reliability factor for communicating with the neighbor comprises:
   assigning a relative weight to each of the reliability for the neighbor and the reliability of the communication link to the neighbor;
   calculating the reliability factor to be a weighted average of the reliability for the neighbor and the reliability of the communication link to the neighbor.

6. The method of claim 4, wherein adjusting the frequency for sending keep-alive messages to the neighbor comprises:
   reducing the frequency for sending keep-alive messages to the neighbor, if the updated reliability factor represents a reliability improvement for communicating with the neighbor; and increasing the frequency for sending keep-alive messages to the neighbor, if the updated reliability factor represents a reliability degradation for communicating with the neighbor.

7. The method of claim 5, wherein the reliability factor (RF) is calculated using the below equation, where A is the measured reliability of the communication link to the neighbor, B is the determined reliability of the neighbor, W1 is a relative weight for A and W2 is a relative weight for B:

$$RF = (W1*A + W2*B)$$

8. A device for sending keep-alive message to a neighbor in a communication network, the device comprising:
   a processor, a memory and a transmitter;
   the processor executing a computer program stored in the memory, the computer program including:
   reliability calculation logic operably coupled to determine a reliability for a communication link to the neighbor and periodically calculate a reliability factor for communicating with the neighbor based upon the reliability for the communication link to the neighbor; and
   frequency variation logic responsive to the reliability calculation logic and operably coupled to calculate a frequency for sending keep-alive messages to the neighbor via the transmitter based upon the reliability factor.

9. The device of claim 8, wherein the reliability calculation logic is operably coupled to determine a reliability for the neighbor and to calculate the reliability factor based also upon the reliability for the neighbor.

10. The device of claim 8, wherein the reliability calculation logic is operably coupled to also determine a reliability for the neighbor, measure a reliability for a communication link to the neighbor, assign a relative weight to each of the reliability for the neighbor and the reliability for the communication link to the neighbor, and calculate the reliability factor to be a weighted average of the reliability of the neighbor and the reliability of the communication link to the neighbor.

11. The device of claim 8, wherein the frequency variation logic is operably coupled to set the frequency for sending keep-alive messages to the neighbor in inverse proportion to the reliability factor.

12. The device of claim 8, wherein the reliability calculation logic is operably coupled to update the reliability factor, and wherein the frequency variation logic is operably coupled to adjust the frequency for sending keep-alive messages to the neighbor based upon the updated reliability factor.

13. The device of claim 10, wherein the reliability factor (RF) is calculated using the below equation, where A is the determined reliability of the communication link to the neighbor, B is the determined reliability of the neighbor, W1 is a relative weight for A and W2 is a relative weight for B:
   $RF = (W1*A + W2*B)$.

14. The device of claim 12, wherein the frequency variation logic is operably coupled to reduce the frequency for sending keep alive messages to the neighbor if the updated reliability factor represents a reliability improvement for communicating with the neighbor and increase the frequency for sending keep-alive messages to the neighbor if the updated reliability factor represents a degradation for communicating with the neighbor.

15. A program product recorded on a computer readable device sending keep-alive messages to a neighbor in a communication network, the program product comprising:
   reliability calculation logic operably coupled to measure a reliability for a communication link to the neighbor and to periodically calculate a reliability factor for communicating with the neighbor based upon the reliability for the communication link to the neighbor; and
   frequency variation logic responsive to the reliability calculation logic and operably coupled to determine a frequency for sending keep-alive messages to the neighbor based upon the reliability factor.

16. The program product of claim 15, wherein the reliability calculation logic is programmed to determine a reliability for the neighbor and calculate the reliability factor based upon the reliability for the neighbor.

17. The program product of claim 15, wherein the reliability calculation logic is operably coupled to also determine a reliability for the neighbor, measure a reliability for a communication link to the neighbor, assign a relative weight to each of the reliability for the neighbor and the reliability for the communication link to the neighbor, and calculate the reliability factor to be a weighted average of the reliability of the neighbor and the reliability of the communication link to the neighbor.

18. The program product of claim 15, wherein the frequency variation logic is programmed to set the frequency for sending keep-alive messages to the neighbor in inverse proportion to the reliability factor.

19. The program product of claim 15, wherein the reliability calculation logic is programmed to update the reliability factor, and wherein the frequency variation logic is operably coupled to adjust the frequency for sending keep-alive messages to the neighbor based upon the updated reliability factor.

20. The program product of claim 19, wherein the frequency variation logic is programmed to reduce the frequency for sending keep alive messages to the neighbor if the updated reliability factor represents a reliability improvement for communicating with the neighbor and increase the frequency for sending keep-alive messages to the neighbor if the updated reliability factor represents a degradation for communicating with the neighbor.

21. Apparatus comprising:
a plurality of interconnected devices including a node and a neighbor in communication over a link,
wherein the node is operably coupled to send keep-alive messages to the neighbor, and
wherein the node is operably coupled to vary a frequency for sending keep-alive messages to the neighbor based upon a periodically computed reliability factor for communicating with the neighbor over the communication link,
wherein the node is operably coupled to calculate the reliability factor based upon a reliability for the neighbor and a measured reliability for the communication link.

22. The apparatus of claim 21, wherein the node is operably coupled to set the frequency for sending keep-alive messages to the neighbor in inverse proportion to the reliability factor.

* * * * *